July 8, 1958 H. J. BLASKOWSKI 2,842,102
STEAM GENERATION
Filed Nov. 18, 1954
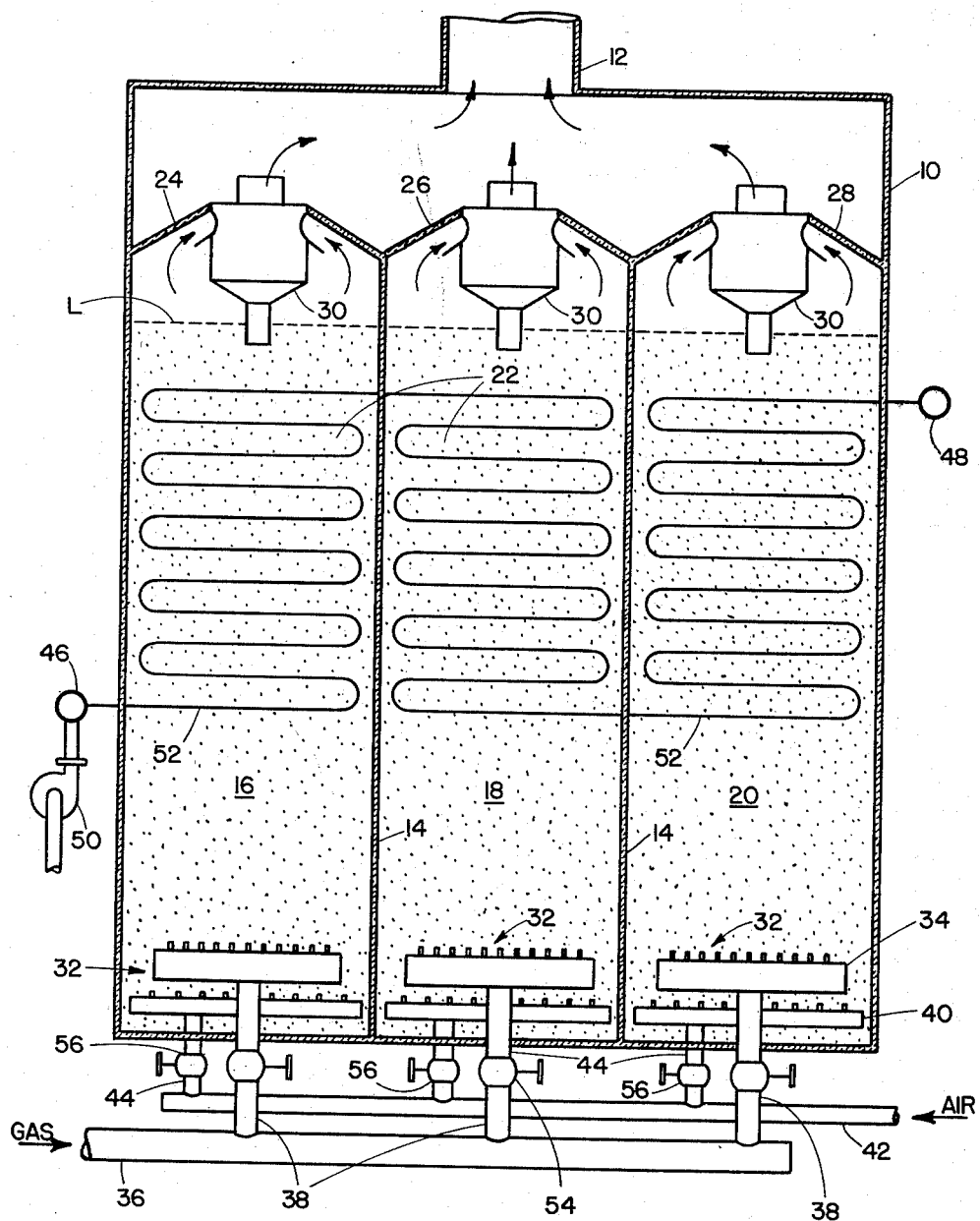
INVENTOR
HENRY J. BLASKOWSKI
BY
Eldon H. Luther
ATTORNEY

United States Patent Office 2,842,102
Patented July 8, 1958

2,842,102

STEAM GENERATION

Henry J. Blaskowski, New York, N. Y., assignor to Combustion Engineering, Inc., New York, N. Y., a corporation of Delaware Application November 18, 1954, Serial No. 469,739

1 Claim. (Cl. 122—4)

This invention relates to an improved method for generating and/or heating steam or for heating other desired fluids and has particular relation to an improved method for this purpose employing fluidized material as a heat exchange medium so arranged as to obtain a wide range of control of the heat input to the fluid.

The invention contemplates the provision of a mass or bed of a discrete material at least a portion of which is an active oxidizing catalyst and which is disposed in a plurality of independent sections or zones. Within the lower portion of each of these sections is injected a fuel and a combustion supporting gas which may, if desired, be pre-mixed before being injected into the material. The fuel, as it passes upwardly through the material, is catalytically oxidized and the rate at which the fuel and combustion supporting gas are injected into the several sections is sufficient to fluidize the material therein with each of the thus fluidized sections having certain properties resembling those of a liquid and being in a turbulent state with what may be termed a pseudo-liquid level established at its upper end and whereat the gases disengage from the material in that section or zone. Positioned within the several fluidized sections are heat exchange means which may conveniently take the form of tubes and through which a fluid such as water or steam is conveyed, this fluid being heated as it passes through the heat exchange means. The heat input to this fluid is controlled by controlling the amount of fuel that is catalytically oxidized and in order to obtain a sufficiently wide range of control so as to be practical for operating of a steam generator or other heat exchange apparatus or system the fuel and air supplied to each of the independent sections is independently controlled.

The active oxidation catalyst which constitutes at least a substantial portion of the mass of discrete material effects complete oxidation of the fuel within each of the sections without the production of a flame and such catalysts as are contemplated owe their activity to a particular physical structure and/or chemical constitution and must be used under conditions which are not destructive of these special characteristics. Thus in the use of active oxidation catalysts, maximum temperatures must be observed in order to avoid deactivation or loss of activity through the alteration of the physical structure or chemical constitution responsible for their relatively high activity.

Examples of oxidation catalysts which are particularly suitable for use with the invention include activated forms of metal oxides impregnated with a minor amount of a metal in finely divided form. In particular, activated forms of alumina, beryllia, thoria, zirconia, or magnesia, or mixtures of these oxides, impregnated with minor amounts of finely divided metals such as platinum, palladium, rhodium, ruthenium, silver, copper, chromium, manganese, nickel, cobalt, or combinations of these metals such as a silver-chromium, copper-chromium, copper-manganese combinations, have been found to be especially suitable.

As well known in the art of catalysts, the so-called activated forms of these metal oxides, such as activated alumina, are those forms which are characterized by a porous structure which possesses a large internal pore volume and surface area. The activated form is prepared by controlled dehydration of a hydrated form of the oxide, control of temperature during the dehydration being essential to prevent destruction of the pore structure. Activated alumina, for example, may be prepared by precipitating a hydrous alumina gel from a solution of an aluminum salt, drying the gel, and thereafter heating carefully at a temperature not higher than about 2000° F. to expel the hydrated water and produce a partially anhydrous or substantially anhydrous oxide often referred to as gamma alumina. Catalytically active alumina may also be prepared from the naturally occurring bauxite, which contains hydrated alumina, by removal of the impurities which it contains, such as iron and silicates, following by heating at a temperature below about 2000° F. to drive off the hydrated water. In contrast to the activated form, other forms of alumina and similar oxides, such as so-called alpha alumina, also frequently referred to as corundum or alundum, are characterized by relatively dense structures having little or no internal pore volume or surface area. Such materials, either by themselves or even coated with metals selected from the list above, relatively speaking, have little or no oxidation activity.

The amount of metal impregnating the activated oxide may vary considerably and the optimum amount depends to some extent upon the particular metal chosen. In the case of platinum or passadium, for example, very small amounts are required to produce an oxidation catalyst of excellent activity, such as from 0.1% to 1.0% by weight based on the weight of the activated metal oxide. In the case of other materials, such as a silver-chromium combination, a somewhat higher percentage of the metal such as from 2.0% to 5.0% may be more desirable.

Impregnation of the active oxide may be accomplished by any desirable method which will result in the depositing of the metal upon the surface of the oxide in finely divided form. Impregnation is most conveniently accomplished by dipping the metal oxide, such as activated alumina, into a solution of a salt of the desired metal and then decomposing the salt. Thus for example, activated alumina may be dipped into a 1.0% by weight aqueous solution of chloroplatinic acid, dried, and then the platinum salt decomposed into metallic platinum by heat. As a result of this type of impregnation, the platinum is distributed over the surface of the alumina in extremely finely divided form.

The maximum temperature at which the catalysts of the type discussed above may be used varies somewhat depending upon the particular catalyst employed, but in general ranges below about 2000° F. For a platinum on alumina catalyst, for example, the maximum operating temperature is of the order of 1800–2000° F., while a catalyst consisting of alumina impregnated with a metal combination such as silver-chromium or copper-chromium becomes deactivated at temperatures of the order of 1600° F.

While oxidation catalysts of the type described above are particularly suitable for use with the invention, it is to be understood that other types having similar activity and similar properties with respect to deactivation temperature may also be employed. In general, it may be stated that suitable oxidation catalysts for use in accordance with the invention should have the following characteristics: Good activity, that is the ability to promote the oxidation of fuels at hihg rates per unit catalyst surface area; wide range of effective operating temperatures, that is, the ability to promote the oxidation of fuels at significant rates at relatively low operating temperatures such as temperatures from 600° F. to 1000°

F. coupled with the ability to operate at high temperatures, such as from 1300° F. to 1800° F. without undergoing deactivation; and finally, good physical stability such as resistance to erosion, attrition or other types of disintegration.

In a fluidized bed of the type hereinbefore mentioned wherein a gas is passed upwardly through a mass of discrete material causing the mass to expand relative to its settled condition and take on a state or condition resembling a boiling liquid with the fluidizing gas leaving the fluidized mass or bed at what may be termed a pseudo-liquid level, high rates of heat transfer prevail both between the material of the bed and the gaseous fluidizing medium and between the material of the bed and the heat exchange coil or the like positioned within the bed with the overall heat transfer rate being many times that prevailing where a fluidized bed is not employed. However, certain limitations are inherent in the use of fluidized beds in connection with the rate at which fuel may be injected and burned therewithin and accordingly the amount of heat that may be imparted to the fluid in the heat exchange coil. When the bed is at least in part composed of an active oxidation catalyst, which is necessary for efficient combustion of the fuel within the bed under ordinary conditions and within practical limits, additional restrictions in this respect are imposed. In such a fluidized bed wherein fuel is injected directly thereinto and catalytically oxidized therewithin it is of course necessary that the rate at which fuel and combustion supporting gas is supplied be sufficient to maintain the bed in a fluidized condition and also to maintain the temperature of the bed at the minimum temperature at which the material is effective to catalytically oxidize the fuel, or in other words, at the activation temperature of the catalyst. However, it is also essential that the rate at which the fuel and combustion supporting gas is supplied be kept below that at which the temperature of the bed would be so high as to destroy or impair the catalyst (this being termed the deactivation temperature of the catalyst) and also below the rate which would produce a gas velocity through the bed so high as to carry away excessive quantities of the material of the bed, this velocity being termed the "entrainment" velocity of the material.

With these limits governing the operation of a catalytic fluidized bed, the permissible range of fuel firing into the bed, i. e., the range determined by the permissible maximum and minimum limits on the rate of fuel firing, is so limited as to greatly restrict the range of control of the heat input to the fluid passing through the heat exchange means disposed in such a bed. However, by dividing the mass into or forming the bed of a plurality of independent sections or zones in which the heat exchange means is disposed and by independently regulating the rate of fuel firing of each of the sections or zones the rate of heat input to the fluid passing through the heat exchange means may be varied over a wide range, the limits of which are determined by the maximum heat input obtained when all the zones are fired at their maximum permissible rate and the minimum heat input obtained when one of the zones is fired at its minimum permissible rate and the other zones are idle, this wide range of control being effected by cutting zones in and out of operation when their capacity is or is not needed, respectively.

It is an object of this invention to provide an improved method of steam generation and/or fluid heating employing a catalytic fluidized bed as a heat exchange medium and having a wide range of control of heat input to the fluid being heated.

Other and further objects of the invention will be apparent to those skilled in the art as the description proceeds.

For clarity and ease of explanation reference will be made to the accompanying drawing wherein there is disclosed a diagrammatic representation of an organization for carrying out the novel method of this invention.

Referring specifically to the drawing, wherein like reference characters are used throughout to designate like elements, there is shown a steam generator comprising a housing 10 from the upper end of which extends a stack 12 and which is provided with vertical partitions 14 that terminate a short distance from the top of the housing and divide the interior of the housing into the separate zones or compartments 16, 18 and 20. Each of these compartments contains a discrete material 22 that has an overall catalytic oxidation activity of the character hereinbefore mentioned and may be made up entirely of an oxidation catalyst or partially of an oxidation catalyst and partly inert material.

The compartments 16, 18 and 20 are capped by closure members 24, 26 and 28 each of which is provided with one or more centrifugal separators 30 depending downwardly into their respective compartments and communicating with openings provided in the closures.

The discrete material 22 is fluidized by fuel and air injected directly thereinto and for this purpose fuel injectors 32 are positioned in each of the compartments with each of the injectors comprising one or more gas distribution conduit 34 which are connected to the supply main 36 by branch conduits 38 and air distribution conduits 40 which are connected to supply main 42 by branch conduits 44.

When in the fluidized condition the material in each of the zones will be expanded so that the pseudo-liquid level produced by this fluidization will be spaced somewhat below the closures 24, this level being identified in the drawing by the dotted line L. The combustion gases generated by the catalytic oxidation of the fuel injected into the zones leave or disengage the material in the zones at the level L and pass through the space thereabove and into the separator 30. These gases contain a small quantity of the relative undersize particles of the discrete material a majority of which particles are collected by separator 30 and returned to the respective zone through the bottom of the separator with the gases passing out the top of the separator and to stack 12.

Heat is absorbed from the fluidized oxidation catalyst in the several zones by heat exchange coils or tubes 52 submerged within this material (only one tube being shown in the drawing) with these tubes being illustratively disclosed as sinuously formed with the sinuous coils in the three zones being serially connected together and interposed between the supply header 46 and the collection header 48. The fluid to be heated is supplied under pressure to the header 46 by pump 50 and is forced through the conduit 52, which passes through the zones or compartments 16, 18 and 20, and is deposited or supplied to the collecting header 48 from which it is conveyed to any desired point and in the case of a steam generator the water or a portion of the water will be converted to steam during traversal of the conduits 52.

As explained hereinbefore the rate at which fuel and air may be supplied to the several zones through burners 32 must be maintained within the minimum limit required to fluidize the material of the zone and maintain the material at the activation temperature of the catalyst and the maximum limit permissible without raising the temperature of the material to the deactivation temperature of the catalyst or creating a gas velocity so high that excessive quantities of the material will be carried away by the gases. For the purpose of accomplishing this regulation, regulating valves 56 are provided in each of the branch conduits 38 interconnecting the gas distributing conduits 34 and the gas main 36, and valves 56 are provided in each of the conduits 44 interconnecting the air distribution conduits 40 and the air supply main 42. Thus the control valves for each of the injectors 32 may be regulated independently and thus the firing rate of each of the three fluidized zones may be independently controlled.

By independently regulating the firing rate of each of the zones the range over which the heat input to the fluid in conduit 52 may be regulated is greatly extended over that obtainable if but a single fluidized zone were employed or if each of the zones were not independently regulated. With the several zones, together with the independent regulation of the zones, the heat input to the fluid in conduit 52 may be varied over the range determined by the maximum heat input obtained when all of the burners 32 are fired at their maximum permissible rates and the minimum heat input obtained when two of the burners are idle or are fired at such a low rate as to impart an inconsequential amount of heat to the fluid in conduit 52 and well below the minimum rate for fluidization of their associated zones while the remaining zone is fired at its minimum permissible rate.

When the capacity of one of the zones is sufficient to impart the required heat to the fluid in conduit 52 when fired at a rate within the maximum and minimum permissible rates the other two zones may be completely deactivated, i. e., no fuel fired thereinto at all, or may be fired only at a rate sufficient to maintain the material of the zone at a given temperature in order to facilitate the starting operation, which rate is below the minimum required to obtain fluidization and maintain the material at the activation temperature of the catalyst and which has no substantial effect insofar as imparting heat to the fluid in conduit 52 is concerned since with non-fluidized material high heat transfer rates are not obtained. When the capacity of the one zone being fired within these permissible rates is not sufficient to impart the required heat to the fluid in conduit 52 a second zone is fired at a rate within these permissible limits. So also when these two zones are not sufficient to impart the required heat to the fluid in conduit 52 the third zone is brought into activation and fired within the permissible limits. The firing rates of the zones that are being fired within the permissible limits are regulated within these limits to impart the desired amount of heat to the fluid in conduit 52.

By cutting in and out two of the three zones when their capacity is or is not needed, respectively, to impart the required heat to the fluid in conduit 52 the range of regulation obtainable is of course greatly increased and at the same time the advantages of high heat transfer rates and high fuel burning efficency as realized with catalytic fluidized bed operation is obtained. Since it is necessary that a steam generator be regulatable over a relatively wide range the improved method and apparatus of this invention has particular significance in connection with steam generators. However, it is to be understood that the novel method of this invention is not limited to applications pertaining to steam generation but may be employed wherever it is found advantageous to controllably heat a liquid by means of passing it in indirect heat exchange relation with a fluidized bed composed, at least in part, of an oxidation catalyst into which fuel is injected and catalytically oxidized.

The organization disclosed is only for the purpose of explaining the novel method of the invention and merely represents one embodiment by which the invention may be practiced. This structural organization may of course be variously modified without effecting the performance of this method. For example, the zones 16, 18 and 20 need not be disposed in side by side relation but may be variously positioned as desired; the coils disposed in the several zones may be connected in parallel rather than in series and when so connected valves may be arranged if desired to shut off flow through the coil disposed in a zone when the zone is not activated; the operation of the valves controlling the individual firing of the zones may be automatic rather than manual as shown; and while three zones have been disclosed this number may be decreased to two or increased to any desired figure, within practical limits with the smaller the individual zone is in size and accordingly the greater the number of zones the greater the resulting range of control over which the heat input may be regulated.

What I claim is:

The method of heating a fluid and controlling the heat input thereto over a wide range comprising providing a plurality of independent separate beds of particulate material which is capable of catalytically oxidizing a fuel-air mixture provided the material is within a predetermined temperature range, passing the fluid to be heated through a heat exchanger in contact with the material of said beds to thereby indirectly impart heat from the beds to said fluid, fluidizing the material of said beds, introducing fuel and air directly into said beds for catalytic oxidation thereof in contact with said material, effecting such oxidation, maintaining the supply of fuel and air to each bed such that the bed temperature is within said predetermined range and individually increasing and decreasing this supply to each bed within the limits dictated by this temperature range to regulate the heat input to the fluid throughout a first range as desired, the upper limit of which is that obtained when all the beds are fired to give the maximum permissible bed temperature within said predetermined temperature range and the lower limit is that obtained when all the beds are fired to give the minimum permissible bed temperature within said predetermined temperature range, providing a second range of regulation of the heat input to the fluid by deactivating one of said beds through the termination of the supply of fuel thereto and increasing and decreasing the fuel and air supply to the other beds within the limits dictated by said predetermined bed temperature range with the upper limit of this second range being that obtained when all of said other beds are fired to give the maximum permissible bed temperature within said predetermined range and the lower limit is that obtained when all of said other beds are fired to give the minimum permissible bed temperature within said predetermined temperature range.

References Cited in the file of this patent

UNITED STATES PATENTS

| | | |
|---|---|---|
| 2,224,014 | Dunham et al. | Dec. 3, 1940 |
| 2,664,346 | Mayhew | Dec. 29, 1953 |
| 2,729,428 | Milmore | Jan. 3, 1956 |